(12) United States Patent
Lamb

(10) Patent No.: US 6,739,086 B1
(45) Date of Patent: May 25, 2004

(54) RODENT CATCHING APPARATUS

(76) Inventor: George K. Lamb, P.O. Box 340, Gruver, TX (US) 79040

( * ) Notice: Subject to any disclaimer, the term of this patent is extended or adjusted under 35 U.S.C. 154(b) by 0 days.

(21) Appl. No.: 10/447,576

(22) Filed: May 30, 2003

(51) Int. Cl.[7] ............................................. A01M 23/38
(52) U.S. Cl. ................................................ 43/99; 43/98
(58) Field of Search .............................. 43/99, 98, 112, 43/64, 65

(56) References Cited

U.S. PATENT DOCUMENTS

| | | | | |
|---|---|---|---|---|
| 119,435 A | * | 9/1871 | Webb | 43/65 |
| 686,481 A | * | 11/1901 | Shafer | 43/98 |
| 922,377 A | * | 5/1909 | Ames | 43/98 |
| 1,024,060 A | * | 4/1912 | Calvert | 43/98 |
| 1,034,976 A | * | 8/1912 | Carmichael | 43/99 |
| 1,045,662 A | * | 11/1912 | Balint | 43/98 |
| 1,045,676 A | * | 11/1912 | Clifford | 43/99 |
| 1,062,126 A | * | 5/1913 | Smith | 43/112 |
| 1,110,186 A | * | 9/1914 | Carmichael | 43/99 |
| 1,112,228 A | * | 9/1914 | Palmer | 43/99 |
| 1,115,695 A | * | 11/1914 | Leyson | 43/99 |
| 1,168,252 A | * | 1/1916 | Erdley | 43/65 |
| 1,307,678 A | * | 6/1919 | Kopel | 43/99 |
| 1,388,782 A | * | 8/1921 | Johnson | 43/99 |
| 1,587,834 A | * | 6/1926 | Hill, Sr. | 43/99 |
| 1,660,013 A | * | 2/1928 | Morawiecki | 43/99 |
| 1,689,529 A | * | 10/1928 | Wesley | 43/65 |
| 1,899,199 A | * | 2/1933 | Kaiser | 43/98 |
| 2,012,384 A | * | 8/1935 | Gatti | 43/112 |
| 2,038,495 A | * | 4/1936 | Keller | 43/112 |
| 2,098,884 A | * | 11/1937 | Rousseau | 43/98 |
| 2,218,403 A | * | 10/1940 | McKee | 43/99 |
| 2,229,300 A | * | 1/1941 | Montroy et al. | 43/98 |
| 2,384,190 A | * | 9/1945 | Miller | 43/112 |
| 2,387,328 A | * | 10/1945 | Horowitz | 43/99 |
| 2,411,766 A | * | 11/1946 | Vincent et al. | 43/99 |
| 2,471,640 A | * | 5/1949 | McFadden | 43/98 |
| 2,519,783 A | * | 8/1950 | Nagl | 43/99 |
| 2,584,498 A | * | 2/1952 | Posey | 43/69 |
| 2,595,130 A | * | 4/1952 | Edwards | 43/98 |
| 2,677,209 A | * | 5/1954 | Hutchison, Sr. | 43/99 |
| 2,763,092 A | * | 9/1956 | Sheridan | 43/99 |
| 3,468,054 A | * | 9/1969 | Levine | 43/98 |
| 3,528,191 A | * | 9/1970 | Hand | 43/64 |
| 3,792,547 A | * | 2/1974 | Day | 43/98 |
| 3,872,619 A | * | 3/1975 | McIlwain | 43/65 |
| 4,037,351 A | * | 7/1977 | Springer | 43/112 |
| 4,074,456 A | * | 2/1978 | Tidwell | 43/98 |
| 4,154,016 A | * | 5/1979 | Reyes | 43/69 |
| 4,205,480 A | * | 6/1980 | Gartner | 43/98 |
| 4,497,130 A | * | 2/1985 | Fitzgerald | 43/98 |
| 4,780,985 A | * | 11/1988 | Coots | 43/98 |
| 4,879,836 A | * | 11/1989 | Dolyny | 43/64 |

(List continued on next page.)

FOREIGN PATENT DOCUMENTS

| | | | | |
|---|---|---|---|---|
| DE | 150078 B1 | * | 3/1904 | 43/64 |
| DE | 618477 B1 | * | 8/1935 | 43/98 |
| DE | 2836797 B1 | * | 3/1980 | |

(List continued on next page.)

*Primary Examiner*—Darren W. Ark
(74) *Attorney, Agent, or Firm*—Norman B. Rainer

(57) ABSTRACT

A rodent catching trap includes a container in the general form of a rectangular bucket having opposed entrance portals and a transverse metal ramp extending between the lower extremities of the portals. A carrying handle is attached to the container. Inclined infeed ramps extend between the portals and the underlying support surface. An electrode is supported by the handle, and extends downwardly to a bait-holding extremity positioned closely above the metal ramp. Electrical contacts supplied with an electrical source of 5000 to 9000 volts are associated with the electrode and metal ramp. When a rodent enters upon the metal ramp and comes within about ¼ inch of the baited electrode, it is electrocuted and falls to the bottom of the bucket, which contains a pool of water.

12 Claims, 2 Drawing Sheets

U.S. PATENT DOCUMENTS

| | | | | |
|---|---|---|---|---|
| 4,914,854 A | * | 4/1990 | Zhou et al. | 43/112 |
| 5,027,547 A | * | 7/1991 | Livshin | 43/98 |
| 5,269,091 A | * | 12/1993 | Johnson et al. | 43/98 |
| 5,280,684 A | * | 1/1994 | Filonczuk | 43/112 |
| 5,369,907 A | * | 12/1994 | Lee | 43/98 |
| 5,406,742 A | * | 4/1995 | Allen | 43/98 |
| 5,517,784 A | * | 5/1996 | Sedore | 43/64 |
| 5,528,852 A | * | 6/1996 | Sarff | 43/64 |
| 5,579,601 A | * | 12/1996 | Norrad | 43/64 |
| 5,632,115 A | * | 5/1997 | Heitman | 43/112 |
| 5,720,126 A | * | 2/1998 | Lamb | 43/69 |
| 5,782,034 A | * | 7/1998 | Robin et al. | 43/64 |
| 5,949,636 A | * | 9/1999 | Johnson et al. | 43/98 |
| 5,953,853 A | * | 9/1999 | Kim | 43/98 |
| 5,996,274 A | * | 12/1999 | Smith et al. | 43/64 |
| 6,609,328 B2 | * | 8/2003 | Swift et al. | 43/98 |

FOREIGN PATENT DOCUMENTS

| | | | | |
|---|---|---|---|---|
| EP | 990389 B1 | * | 4/2000 | |
| FR | 610704 B1 | * | 6/1926 | 43/98 |
| FR | 730778 B1 | * | 5/1932 | 43/98 |
| FR | 919036 B1 | * | 2/1947 | 43/98 |
| FR | 2560006 B1 | * | 8/1985 | |
| FR | 2689371 B1 | * | 10/1993 | |
| FR | 2750294 B1 | * | 6/1996 | |
| GB | 395961 B1 | * | 7/1933 | 43/98 |
| GB | 398287 B1 | * | 9/1933 | 43/98 |
| GB | 526444 B1 | * | 9/1940 | 43/64 |
| GB | 2107164 B1 | * | 4/1983 | |
| IT | 264132 B1 | * | 4/1929 | 43/98 |
| JP | 2002-160 B1 | * | 1/2002 | |
| WO | WO-99/15008 B1 | * | 4/1999 | |
| WO | WO-99/18780 B1 | * | 4/1999 | |

* cited by examiner

RODENT CATCHING APPARATUS

BACKGROUND OF THE INVENTION

1. Field of the Invention

The present invention relates to rodent traps, and more particularly concerns a trap capable of collecting a multitude of rodents such as mice and rats.

2. Description of the Prior Art

The use of baited spring-activated devices for killing mice is well known. Such devices must be monitored and re-set after each mouse encounter. This task is generally considered unpleasant because of the danger to the operator in setting the trap and the need to handle wounded and dead rodents and severed parts thereof. Also, the loud noise produced by the snap of the spring alerts other rodents to the peril of the trap.

The occurrence of rodents at an agricultural location is particularly troublesome because of the abundant food supply for the rodents, who can infest harvested crops and destroy equipment. In such locations, because of the large areas involved, a multitude of rodent traps are generally employed. The traps must be easily serviceable and must be of sufficiently rugged construction to survive weathering factors and wind-blown farm debris.

The use of mouse traps employing water-filled containers to drown and collect mice is disclosed in U.S. Pat. No. 4,241,531 to Nelson et. al. and U.S. Pat. No. 4,845,887 to Snyder. Such traps afford the convenience of collecting a number of mice, which can easily be disposed of merely by pouring the water and dead mice out of the container.

Although rodents are attracted to a trap primarily by the scent of the bait, their visual perception of the trap and its surroundings may well influence their decision to approach the trap. The traps of Snyder and Nelson et. al. involve labyrinthal, constrictive passageways which prevent the rodent from actually seeing the bait.

Various pivoted platforms, known as "trap doors" have been disclosed for catching mice by causing the mice to fall by gravity into an underlying holder chamber which may contain water. Examples of trap doors are found in U.S. Pat. Nos. 271,952; 506,954; 639,246; 1,185,452; 1,228,324; and 1,578,080. Other means have also been variously disclosed for causing a mouse to fall into a holding chamber. However, the very fast reflex actions of mice often enable them to jump clear of the trap door or other mechanism.

U.S. Pat. No. 5,720,126 to Lamb discloses a rodent trap having an elongated roller disposed horizontally in a water-holding container. A bait-holding trigger mechanism activates a motor to rotate the roller, thereby causing the rodent to fall into the water. Although presumably effective, the Lamb apparatus is of some complexity, and relatively expensive. It also allows only one entrance into the trap apparatus.

U.S. Pat. No. 5,949,636 to Johnson et. al. discloses an apparatus for electrocuting rodents. Whereas earlier rodent electrocution devices employ mechanically activated triggers requiring the rodent to exert sufficient force to close contacts, the Johnson et. al. apparatus employs a sensing mechanism which permits triggering of a high voltage output without need for some force to be exerted by the rodent. However, the sensing feature causes the apparatus to be of complex design. Also, the apparatus must be serviced with each rodent killed, yet does not facilitate sanitary disposal relative to personnel required to remove the dead rodents.

U.S. Pat. No. 5,953,853 to Kim concerns a rodent trap which detects the presence of a rodent that has been lured into the trap by a bait, and causes electrocution of the rodent. A series of mechanical features cause the dead rodent to be dumped into a collecting box. In view of the mechanical complexity of the apparatus, it appears to be of expensive construction, and susceptible to malfunction.

U.S. Pat. No. 3,468,054 to Levine discloses a rodent trap that employs electrical current of 480 volts to kill a rodent attracted into the trap by a scented bait. There is, however, only a single entrance, and no provision for accumulating dead rodents. The trap must be re-set following each kill. Because the killed rodent remains in contact with the electrical circuit, a timing mechanism is required to turn off the current following each kill.

It is accordingly a principle object of the present invention to provide a rodent trap which can kill and collect a multitude of rodents without requiring re-setting following each kill.

It is another object of this invention to provide a rodent trap as in the foregoing object having more than one entrance.

It is a further object of the present invention to provide a rodent trap of the aforesaid nature which facilitates sanitary holding and disposal of a collected multitude of rodents.

It is yet another object of this invention to provide a rodent trap of the aforesaid nature which employs an electrocution principle but does not permit a killed rodent to remain in contact with the electrocuting current.

It is a still further object of the present invention to provide a rodent trap of the aforesaid nature which has no moving parts susceptible to mechanical malfunction.

It is an additional object of this invention to provide a rodent trap of the aforesaid nature which does not require the rodent to exert force upon a triggering mechanism.

It is a further object of the present invention to provide a rodent trap of the aforesaid nature, a number of which can be operated from the same source of electricity.

It is still another object of this invention to provide a rodent trap of the aforesaid nature of simple, durable construction amenable to low cost manufacture.

These objects and other objects and advantages of the invention will be apparent from the following description.

SUMMARY OF THE INVENTION

The above and other beneficial objects and advantages are accomplished in accordance with the present invention by a rodent catching trap apparatus comprising:
- a) a container comprised of a bottom panel and a sidewall upwardly directed from said bottom panel and terminating in an upper extremity,
- b) a transverse metal ramp extending across said container in attachment to said sidewall at two opposed sites at equal elevations adjacent said upper extremity,
- c) entrance portals in said sidewall disposed above and contiguous with said transverse ramp at said attachment sites,
- d) a handle which spans said container in orthogonal relationship to said transverse ramp and attaches to said sidewall at two opposed sites adjacent said upper extremity,
- e) an inclined infeed ramp removably interactive with each entrance portal in opposed facing relationship,
- f) a bait-holding electrode supported by said handle and downwardly directed therefrom to a location above said transverse ramp, and g) connection terminals associated with said electrode and transverse ramp for achieving releasable connection to a source of high voltage electricity.

In a further aspect of the present invention, a rodent catching system is provided wherein a number of said traps are connected to a single source of electrical current having a voltage between 5000 and 9000 volts.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
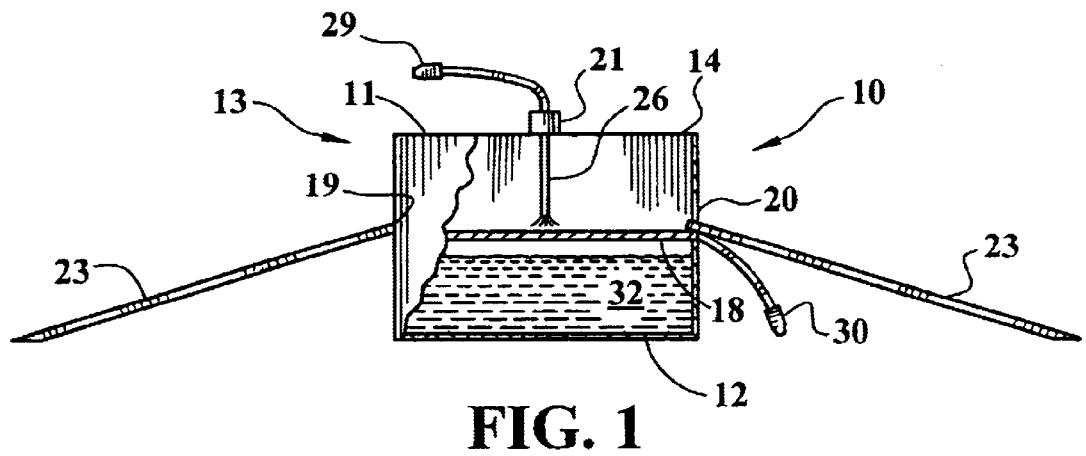
FIG. 1 is a side view of an embodiment of the rodent trap of the present invention with portions broken away to reveal interior details.
Figure 2:
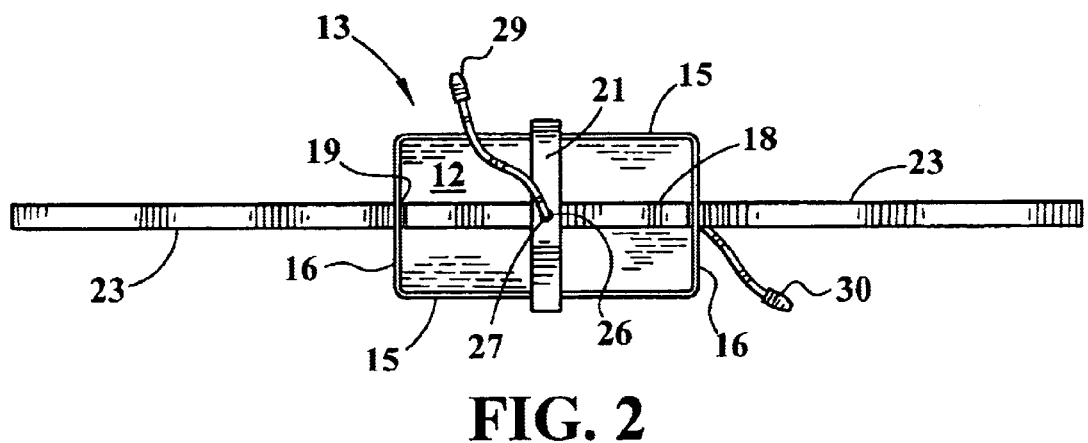
FIG. 2 is a top plan view of the rodent trap of FIG. 1.
Figure 3:
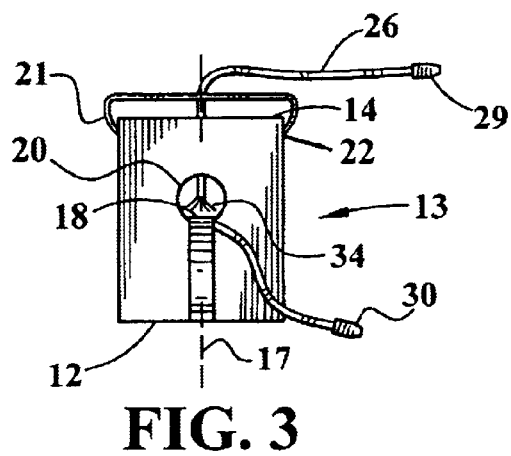
FIG. 3 is an end view of the rodent trap of FIG. 1.

Referring now to FIGS. 1–3, an embodiment of the rodent trap 10 of the present invention is shown comprised of container 11 having bottom panel 12 and encircling sidewall 13 upwardly directed from said bottom panel and terminating in upper extremity 14. The height of the container, measured from bottom panel 12 to upper extremity 14, may range from 6 to 10 inches. The container may be of metal or plastic construction, and is preferably of rectangular contour, defined by opposed long sidewall portions 15 and opposed short sidewall portions 16. The length of the rectangular container, measured between said short sidewall portions, may range from 8 to 15 inches, and the width of the rectangular container, measured between said long sidewall portions may range from 6 to 10 inches. The exemplified container of rectangular contour has a vertical plane of symmetry 17 centered between long sidewall portions 15. Said sidewall portions may be downwardly convergent, whereby the area of bottom panel 12 is smaller than the area circumscribed by upper extremity 14.

A transverse metal ramp 18 extends across container 11 in centered relationship upon plane of symmetry 17, and attaches to said short sidewall portions at two opposed sites 19 at equal elevations. The transverse ramp is of rigid construction and may have a width between about 1 and 2 inches.

An entrance portal 20 is disposed in each short sidewall portion at a location above and contiguous with said transverse ramp at said attachment sites 19. Portal 20 is preferably of circular configuration, having a diameter between about 2 and 3 inches. Said portals are preferably centered at locations between 4 and 7 inches above bottom panel 12.

A rigid handle 21 spans said container in orthogonal relationship to said transverse ramp and attaches to said sidewall at two opposed sites 22 adjacent upper extremity 14. Said attachment may be achieved with conventional fasteners. In alternative embodiments, the handle may be integral with the sidewall as a feature of a monolithic plastic molded structure.

Inclined infeed ramp means 23 is interactive with each entrance portal in opposed facing relationship. Said infeed ramp means may have a length between 12 and 20 inches, and should present an infeed angle of less than 45° with respect to the plane of the bottom panel 12. Said ramp means may be removable rigid members, or may be fixedly associated with said entrance portals as rolled up members which can be deployed when and where the trap is positioned.

A bait-holding electrode in the form of insulated multi-filament conductor cable 26 is secured by passage through aperture 27 at the geometric center of handle 21. Cable 26 descends to a lower extremity 34 located about 1–2 inches above transverse ramp 18. At said lower extremity, the conductor filaments are splayed and coated with or otherwise made to hold an odoriferous bait such as peanut butter or cheese. Such arrangement enables the bait to be clearly seen from either portal 20.

Connection terminals 29 and 30 are associated with said bait-holding electrode and transverse ramp, respectively. Said terminals permit releasable connection to a source of high voltage electricity. The electrical current is preferably supplied from an electrified fence charging system commonly employed in the fencing of pastureland. Said systems produce a voltage in the range of 5000 to 9000 volts. The connections are made in a manner such that, a rodent standing on said transverse ramp and touching said bait completes an electrical circuit.

It has been found that, at voltages in the range of 5000–9000 volts, the requisite electrical circuit is completed when the rodent's nose is about ¼ inch away from the bait. Accordingly, the operation of the apparatus is very efficient because the rodent need not exert a force against the bait, such force possibly serving to alert and educate the rodent as to the peril associated with the bait.

Once electrocuted, the rodent falls off the transverse ramp into an underlying pool of water 32 in the reservoir. In this manner, the rodent does not stay in contact with the electrical current. The pool of water preferably contains a disinfectant capable of destroying pathogenic microbial organisms.

During periodic servicing, the electrical source is disconnected with respect to terminals 29 and/or 30, the contents of the container are emptied and replaced with a new pool of water. It is to be noted that the open upper extremity of the container facilitates servicing and permits dissemination of the odor of the bait.

Figure 4:
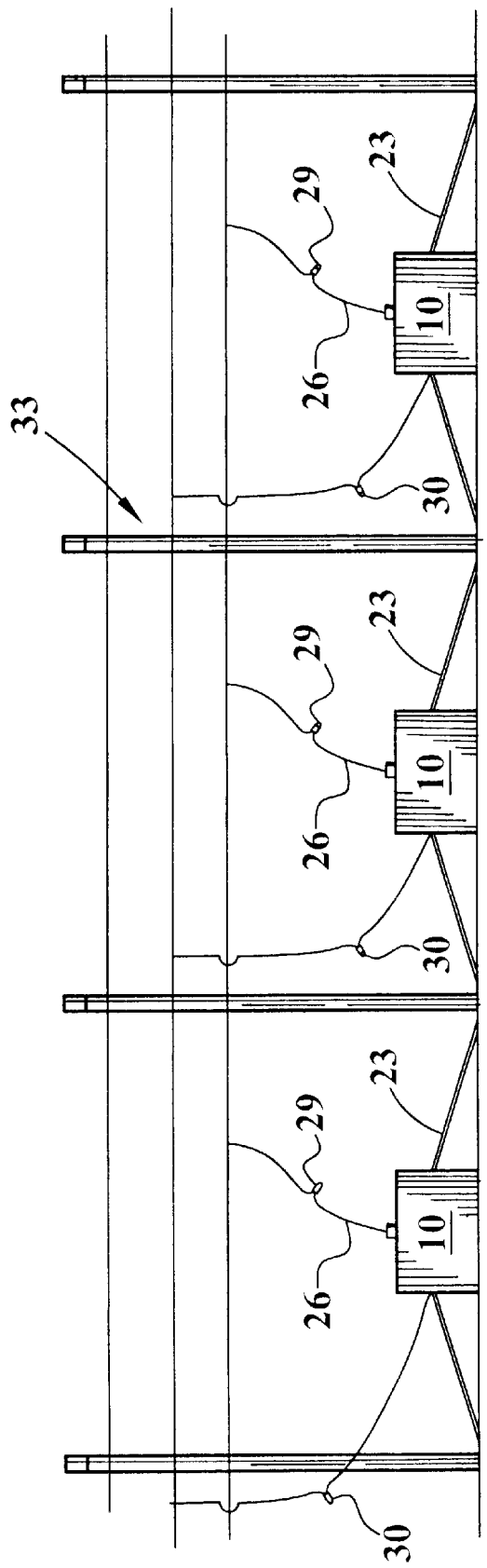
FIG. 4 is a schematic side view of an embodiment of a rodent catching system employing a number of the rodent traps of FIG. 1.

In the rodent trap system of this invention, as shown in FIG. 4, a series of rodent traps of the aforesaid nature are connected in parallel relationship to a single source of electrified fence current supplied from fence 33. In other embodiments, single units of the rodent trap of this invention, intended for indoor use, may be provided with an associated electrical transformer which, when connected to a household electrical supply such as 110V AC, will produce an output voltage in the range of 5000 to 9000 volts.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A rodent catching trap apparatus comprising:
   a) a container comprised of a bottom panel and an encircling sidewall upwardly directed from said bottom panel and terminating in an upper edge extremity,
   b) a transverse metal ramp in attachment to said sidewall at two opposed sites at equal elevations, said transverse metal ramp consisting of a single planar piece which extends completely across said container between said two opposed sites, c) entrance portals in said sidewall disposed above and contiguous with said transverse ramp at said attachment sites, d) a handle which spans said container in orthogonal relationship to said transverse ramp and attaches to said sidewall at two opposed sites adjacent said upper edge extremity, e) inclined infeed ramp means interactive with each entrance portal in opposed facing relationship, f) a bait-holding electrode supported by said handle and downwardly directed therefrom to a location above said transverse ramp, and g) connection terminals associated with said electrode and transverse ramp for achieving releasable connection to a source of high voltage electricity, such that a rodent standing on said transverse ramp and touching bait on said bait-holding electrode completes an electrical circuit.

2. A rodent catching system comprising a number of the trap apparatus of claim 1 connected to a single source of electrical current having a voltage between 5000 and 9000 volts.

3. The rodent catching trap apparatus of claim 1 wherein said upper edge extremity is circuitous within a plane parallel to said bottom panel.

4. The rodent catching trap apparatus of claim 1 wherein said container has a rectangular contour having opposed long sidewall portions and opposed short sidewall portions.

5. The rodent catching trap apparatus of claim 4 having a vertical plane of symmetry centered between said long sidewall portions.

6. The rodent catching trap apparatus of claim 5 wherein said infeed ramp means is disposed at an upward angle of less than 45° with respect to the plane of said bottom panel.

7. The rodent catching trap apparatus of claim 6 wherein said infeed ramp means are removable rigid members.

8. The rodent catching trap apparatus of claim 6 wherein said infeed ramp means is fixedly associated with said entrance portals as rolled-up members which can be deployed when and where the trap is positioned.

9. The rodent catching trap apparatus of claim 4 wherein said electrode terminates at a location between 1 and 2 inches above said transverse ramp and positioned such that bait which is secured to said electrode is visible from either entrance portal.

10. The rodent catching trap apparatus of claim 9 wherein said container holds a pool of water.

11. The rodent catching trap apparatus of claim 10 wherein said water contains a disinfectant capable of destroying pathogenic microbial organisms.

12. The rodent catching trap apparatus of claim 4 further comprising an electrical transformer which, when connected to a household electrical supply of 110 volts AC, produces an output voltage in the range of 5000–9000 volts AC which is fed to said electrode.

* * * * *